United States Patent [19]

Reininger et al.

[11] Patent Number: 5,426,463
[45] Date of Patent: Jun. 20, 1995

[54] APPARATUS FOR CONTROLLING QUANTIZING IN A VIDEO SIGNAL COMPRESSOR

[75] Inventors: Daniel J. Reininger, Plainsboro; Ajanta Guha, Upper Montclair, both of N.J.

[73] Assignee: RCA Thomson Licensing Corporation, Princeton, N.J.

[21] Appl. No.: 20,920

[22] Filed: Feb. 22, 1993

[51] Int. Cl.⁶ .............................................. H04N 7/40
[52] U.S. Cl. .................................... 348/405; 348/419
[58] Field of Search ............... 348/405, 419, 417, 420; H04N 7/137

[56] References Cited

U.S. PATENT DOCUMENTS

| | | | |
|---|---|---|---|
| 4,558,350 | 12/1985 | Murakami | 348/417 |
| 4,862,173 | 8/1989 | Nishitani | 341/200 |
| 4,887,156 | 12/1989 | Ohki | 358/133 |
| 4,954,892 | 9/1990 | Asai et al. | 358/133 |
| 4,970,591 | 11/1990 | Ohki | 358/136 |
| 4,972,260 | 11/1990 | Fujikawa et al. | 358/136 |
| 5,073,820 | 12/1991 | Nakagawa et al. | 348/405 |
| 5,084,904 | 1/1992 | Daito | 375/27 |
| 5,136,376 | 8/1992 | Yagasaki et al. | 348/409 |
| 5,136,377 | 8/1992 | Johnston et al. | 358/136 |
| 5,144,424 | 9/1992 | Savatier | 358/133 |
| 5,144,426 | 9/1992 | Tanaka et al. | 358/133 |
| 5,146,324 | 9/1992 | Miller et al. | 348/405 |
| 5,150,208 | 9/1992 | Otaka et al. | 358/133 |
| 5,159,447 | 10/1992 | Haskell et al. | 358/133 |
| 5,307,163 | 4/1994 | Hatano et al. | 348/420 |
| 5,333,012 | 7/1994 | Singhal et al. | 348/405 |
| 5,349,383 | 9/1994 | Parke et al. | 348/405 |

Primary Examiner—Tommy P. Chin
Assistant Examiner—A. Au
Attorney, Agent, or Firm—Joseph S. Tripoli; Eric P. Herrmann; Ronald H. Kurdyla

[57] ABSTRACT

A rate controlled VBR quantizing system includes a quantizer for quantizing partially compressed video data and further apparatus for monitoring the amount of compressed output data. Dependent upon the amount of compressed output data being lesser or greater than a predetermined value, the quantizer is conditioned to operate in a fixed quantization mode, or a mode wherein only selected blocks of data in respective frames are adaptively quantized, respectively.

17 Claims, 6 Drawing Sheets

I FRAME ADAPTIVE QUANTIZATION TABLE

| New q| | 7 | 8 | 9 | 10 | 11 | 12 | 13 | 14 | 15 | 16 | 17 | 18 | 19 | 20 | 21 | 22 | 23 | 24 | 25 | 26 | 28 | 30 | 32 |
|---|---|---|---|---|---|---|---|---|---|---|---|---|---|---|---|---|---|---|---|---|---|---|---|
| Old q| | | | | | | | | | | | | | | | | | | | | | | | |
| 7 | 0 | 8 | 16 | 22 | 27 | 32 | 36 | 40 | 43 | 46 | 48 | 51 | 53 | 55 | 57 | 58 | 60 | 61 | 63 | 64 | 67 | 70 | 73 |
| 8 | | 0 | 8 | 15 | 20 | 25 | 29 | 34 | 37 | 41 | 44 | 46 | 49 | 51 | 52 | 54 | 56 | 58 | 59 | 60 | 63 | 66 | 69 |
| 9 | | | 0 | 7 | 13 | 19 | 24 | 28 | 32 | 36 | 38 | 41 | 44 | 46 | 48 | 50 | 52 | 54 | 56 | 57 | 60 | 64 | 67 |
| 10 | | | | 0 | 6 | 12 | 17 | 22 | 26 | 30 | 33 | 37 | 40 | 42 | 44 | 46 | 48 | 50 | 52 | 53 | 56 | 59 | 63 |
| 11 | | | | | 0 | 6 | 12 | 17 | 21 | 25 | 28 | 32 | 35 | 38 | 40 | 42 | 44 | 46 | 48 | 50 | 54 | 58 | 52 |
| 12 | | | | | | 0 | 6 | 11 | 15 | 20 | 23 | 27 | 30 | 33 | 36 | 38 | 40 | 43 | 45 | 46 | 49 | 53 | 57 |
| 13 | | | | | | | 0 | 5 | 10 | 15 | 18 | 22 | 26 | 29 | 31 | 34 | 37 | 39 | 41 | 43 | 47 | 50 | 54 |
| 14 | | | | | | | | 0 | 5 | 9 | 13 | 18 | 22 | 25 | 28 | 30 | 33 | 35 | 37 | 39 | 43 | 47 | 51 |
| 15 | | | | | | | | | 0 | 5 | 9 | 13 | 17 | 21 | 24 | 27 | 30 | 32 | 34 | 36 | 40 | 44 | 48 |
| 16 | | | | | | | | | | 0 | 5 | 9 | 12 | 16 | 20 | 23 | 25 | 28 | 30 | 33 | 38 | 41 | 45 |
| 17 | | | | | | | | | | | 0 | 5 | 9 | 11 | 16 | 20 | 23 | 25 | 26 | 30 | 35 | 39 | 44 |
| 18 | | | | | | | | | | | | 0 | 5 | 8 | 11 | 15 | 18 | 21 | 23 | 26 | 31 | 36 | 41 |
| 19 | | | | | | | | | | | | | 0 | 5 | 8 | 10 | 14 | 18 | 20 | 23 | 28 | 32 | 37 |
| 20 | | | | | | | | | | | | | | 0 | 5 | 7 | 11 | 14 | 17 | 19 | 24 | 29 | 34 |
| 21 | | | | | | | | | | | | | | | 0 | 4 | 8 | 10 | 13 | 16 | 22 | 28 | 32 |
| 22 | | | | | | | | | | | | | | | | 0 | 4 | 6 | 9 | 13 | 20 | 27 | 31 |
| 23 | | | | | | | | | | | | | | | | | 0 | 4 | 6 | 9 | 14 | 19 | 24 |
| 24 | | | | | | | | | | | | | | | | | | 0 | 4 | 6 | 9 | 14 | 19 |
| 25 | | | | | | | | | | | | | | | | | | | 0 | 4 | 6 | 9 | 14 |
| 26 | | | | | | | | | | | | | | | | | | | | 0 | 4 | 6 | 9 |
| 28 | | | | | | | | | | | | | | | | | | | | | 0 | 4 | 6 |
| 30 | | | | | | | | | | | | | | | | | | | | | | 0 | 4 |
| 32 | | | | | | | | | | | | | | | | | | | | | | | 0 |

(xs-frac x 100 →)

FIG. 4

B FRAME ADAPTIVE QUANTIZATION TABLE

| New qP | 8 | 9 | 10 | 11 | 12 | 13 | 14 | 15 | 16 | 17 | 18 | 19 | 20 | 21 | 22 | 23 | 24 | 25 | 26 | 27 | 28 | 30 | 32 |
|---|---|---|---|---|---|---|---|---|---|---|---|---|---|---|---|---|---|---|---|---|---|---|---|
| Old qP | | | | | | | | | | | | | | | | | | | | | | | |
| 8 | 0 | 11 | 21 | 28 | 36 | 41 | 46 | 53 | 54 | 59 | 62 | 63 | 67 | 68 | 70 | 72 | 73 | 75 | 76 | 78 | 79 | 82 | 85 |
| 9 | | 0 | 10 | 18 | 28 | 33 | 39 | 45 | 48 | 53 | 56 | 58 | 62 | 64 | 66 | 68 | 70 | 72 | 73 | 75 | 76 | 79 | 82 |
| 10 | | | 0 | 10 | 19 | 25 | 31 | 40 | 42 | 48 | 52 | 53 | 58 | 60 | 62 | 64 | 66 | 68 | 70 | 72 | 73 | 76 | 79 |
| 11 | | | | 0 | 10 | 16 | 23 | 33 | 35 | 43 | 46 | 48 | 53 | 55 | 58 | 60 | 62 | 64 | 66 | 68 | 70 | 74 | 78 |
| 12 | | | | | 0 | 7 | 15 | 27 | 28 | 37 | 40 | 42 | 48 | 50 | 53 | 56 | 58 | 61 | 63 | 65 | 67 | 71 | 75 |
| 13 | | | | | | 0 | 8 | 20 | 22 | 32 | 35 | 37 | 44 | 46 | 49 | 52 | 55 | 58 | 60 | 62 | 64 | 68 | 72 |
| 14 | | | | | | | 0 | 13 | 15 | 26 | 29 | 31 | 38 | 41 | 44 | 47 | 51 | 54 | 56 | 59 | 61 | 66 | 71 |
| 15 | | | | | | | | 0 | 1 | 13 | 17 | 20 | 28 | 31 | 35 | 38 | 42 | 46 | 49 | 52 | 54 | 59 | 64 |
| 16 | | | | | | | | | 0 | 12 | 16 | 19 | 27 | 30 | 35 | 38 | 42 | 45 | 48 | 51 | 54 | 58 | 62 |
| 17 | | | | | | | | | | 0 | 4 | 7 | 17 | 21 | 25 | 29 | 33 | 37 | 41 | 44 | 47 | 53 | 58 |
| 18 | | | | | | | | | | | 0 | 3 | 13 | 17 | 21 | 27 | 30 | 34 | 38 | 41 | 44 | 50 | 56 |
| 19 | | | | | | | | | | | | 0 | 10 | 14 | 19 | 24 | 28 | 32 | 36 | 40 | 43 | 48 | 54 |
| 20 | | | | | | | | | | | | | 0 | 5 | 9 | 14 | 19 | 24 | 28 | 32 | 36 | 44 | 48 |
| 21 | | | | | | | | | | | | | | 0 | 5 | 10 | 15 | 20 | 24 | 29 | 33 | 38 | 43 |
| 22 | | | | | | | | | | | | | | | 0 | 6 | 11 | 16 | 21 | 25 | 29 | 33 | 37 |
| 23 | | | | | | | | | | | | | | | | 0 | 6 | 11 | 16 | 20 | 25 | 30 | 35 |
| 24 | | | | | | | | | | | | | | | | | 0 | 6 | 11 | 15 | 20 | 28 | 33 |
| 25 | | | | | | | | | | | | | | | | | | 0 | 6 | 9 | 15 | 24 | 29 |
| 26 | | | | | | | | | | | | | | | | | | | 0 | 5 | 10 | 23 | 25 |
| 27 | | | | | | | | | | | | | | | | | | | | 0 | 6 | 20 | 26 |
| 28 | | | | | | | | | | | | | | | | | | | | | 0 | 6 | 20 |
| 30 | | | | | | | | | | | | | | | | | | | | | | 0 | 6 |
| 32 | | | | | | | | | | | | | | | | | | | | | | | 0 |

FIG. 5

P FRAME ADAPTIVE QUANTIZATION TABLE

| New qB | 10 | 11 | 12 | 13 | 14 | 15 | 16 | 17 | 18 | 19 | 20 | 21 | 22 | 23 | 24 | 25 | 26 | 27 | 28 | 29 | 30 | 32 |
|---|---|---|---|---|---|---|---|---|---|---|---|---|---|---|---|---|---|---|---|---|---|---|
| Old qB | | | | | | | | | | | | | | | | | | | | | | |
| 10 | 0 | 15 | 20 | 30 | 40 | 50 | 52 | 55 | 58 | 60 | 64 | 65 | 66 | 71 | 76 | 77 | 78 | 80 | 81 | 83 | 84 | 86 |
| 11 | | 0 | 5 | 17 | 29 | 41 | 44 | 47 | 50 | 54 | 57 | 59 | 60 | 66 | 71 | 72 | 74 | 76 | 78 | 80 | 81 | 84 |
| 12 | | | 0 | 10 | 25 | 37 | 40 | 43 | 47 | 50 | 55 | 57 | 58 | 64 | 70 | 72 | 73 | 75 | 77 | 78 | 80 | 83 |
| 13 | | | | 0 | 16 | 30 | 34 | 38 | 41 | 45 | 49 | 51 | 53 | 60 | 66 | 67 | 68 | 71 | 74 | 73 | 78 | 81 |
| 14 | | | | | 0 | 15 | 20 | 24 | 29 | 34 | 39 | 42 | 44 | 51 | 59 | 62 | 64 | 67 | 69 | 72 | 74 | 79 |
| 15 | | | | | | 0 | 5 | 10 | 15 | 21 | 27 | 30 | 33 | 42 | 51 | 54 | 57 | 60 | 63 | 66 | 68 | 72 |
| 16 | | | | | | | 0 | 5 | 11 | 15 | 20 | 25 | 29 | 39 | 49 | 52 | 55 | 58 | 61 | 64 | 67 | 71 |
| 17 | | | | | | | | 0 | 6 | 11 | 17 | 21 | 24 | 35 | 44 | 49 | 52 | 55 | 58 | 62 | 65 | 70 |
| 18 | | | | | | | | | 0 | 6 | 14 | 17 | 20 | 31 | 42 | 45 | 49 | 53 | 56 | 59 | 63 | 69 |
| 19 | | | | | | | | | | 0 | 6 | 11 | 14 | 25 | 37 | 41 | 45 | 49 | 52 | 56 | 60 | 68 |
| 20 | | | | | | | | | | | 0 | 4 | 7 | 20 | 33 | 37 | 41 | 44 | 48 | 52 | 56 | 64 |
| 21 | | | | | | | | | | | | 0 | 6 | 15 | 30 | 35 | 39 | 42 | 46 | 51 | 55 | 63 |
| 22 | | | | | | | | | | | | | 0 | 10 | 28 | 32 | 36 | 40 | 44 | 49 | 53 | 62 |
| 23 | | | | | | | | | | | | | | 0 | 8 | 18 | 24 | 29 | 35 | 39 | 45 | 55 |
| 24 | | | | | | | | | | | | | | | 0 | 6 | 11 | 17 | 23 | 29 | 35 | 48 |
| 25 | | | | | | | | | | | | | | | | 0 | 6 | 12 | 20 | 26 | 29 | 37 |
| 26 | | | | | | | | | | | | | | | | | 0 | 5 | 18 | 22 | 23 | 29 |
| 27 | | | | | | | | | | | | | | | | | | 0 | 6 | 15 | 19 | 28 |
| 28 | | | | | | | | | | | | | | | | | | | 0 | 6 | 15 | 19 |
| 29 | | | | | | | | | | | | | | | | | | | | 0 | 6 | 15 |
| 30 | | | | | | | | | | | | | | | | | | | | | 0 | 6 |
| 32 | | | | | | | | | | | | | | | | | | | | | | 0 |

APPARATUS FOR CONTROLLING QUANTIZING IN A VIDEO SIGNAL COMPRESSOR

This invention relates to the quantizing apparatus in a video signal compression system.

BACKGROUND OF THE INVENTION

Video signal compression apparatus typically include circuitry to quantize codewords of partially compressed signal, causing many of the quantized codewords to have similar values, which condition is conducive to run length encoding. Thereafter the quantized codewords are typically run and variable length encoded to provide the signal in compressed format. The term "partially compressed signal" refers to signal provided by, for example, a discrete cosine transform, or DCT, processor. Video data provided by DCT processors occurs in blocks of, for example, $8\times 8$ coefficients representing a matrix of $8\times 8$ contiguous pixels. Typically the respective coefficients in a block are quantized by different amounts depending upon the relative importance of the respective coefficients. In quantizing a block of such coefficients a quantization matrix is utilized. This quantization matrix includes the quantizing values to be applied to the respective coefficients in a block. Quantization of the video data may be performed by applying the same matrix or table of quantization values to all blocks of coefficients (codewords). This is referred to herein as fixed quantization, even though the quantizing values in the matrix may be different. Since different frames of video signal represent different images, it will be readily appreciated that the amount of compressed video data resulting from fixed quantization will be variable from frame to frame, giving rise to variable bit rate, VBR, compression.

Certain signal transmission systems cannot efficiently accommodate VBR compressed signal, hence constant bit rate, CBR, compression systems have been developed. In the CBR systems the quantization of codewords is made adaptive to control the number of compressed data. Typically the volume of compressed data is monitored and the quantization values are changed in inverse proportion to the volume of compressed data in order to render the number of compressed bits per frame substantially constant. Adaptive quantizing systems also utilize tables of quantizing values for quantizing the blocks of coefficients. Adaptivity is typically realized by simply scaling the quantizing values as they are output from the table for application to the respective coefficients of a block. Nominally all quantizing values provided from the quantization table are scaled by the same factor, but the scale factor may vary from block to block.

CBR compression systems tend to cause the image quality from frame to frame to vary., but constant bit rate is advantageous if the compressed signal is to be multiplexed with other signals for transmission. Alternatively, VBR compressed signal tends to provide substantially uniform image quality from frame to frame, but is more difficult to transmit in a multiplexed signal situation.

SUMMARY OF THE INVENTION

The present invention is a rate controlled VBR quantizing system which provides limits to the amount of compressed data, but substantially retains image quality uniformity from frame to frame. This system includes a quantizer for quantizing partially compressed video data and further apparatus for monitoring the amount of compressed output data. Dependent upon the amount of compressed output data being lesser or greater than a predetermined value, the quantizer is conditioned to operate in a fixed quantization mode, or a mode wherein only selected blocks of data in respective frames are adaptively quantized, respectively.

BRIEF DESCRIPTION OF THE DRAWINGS

FIGS. 4, 5 and 6 are tables of representative quantization values for frames of video signal compressed according to intraframe processing, forward interframe processing and bidirectional interframe processing respectively.

DETAILED DESCRIPTION

Figure 1:
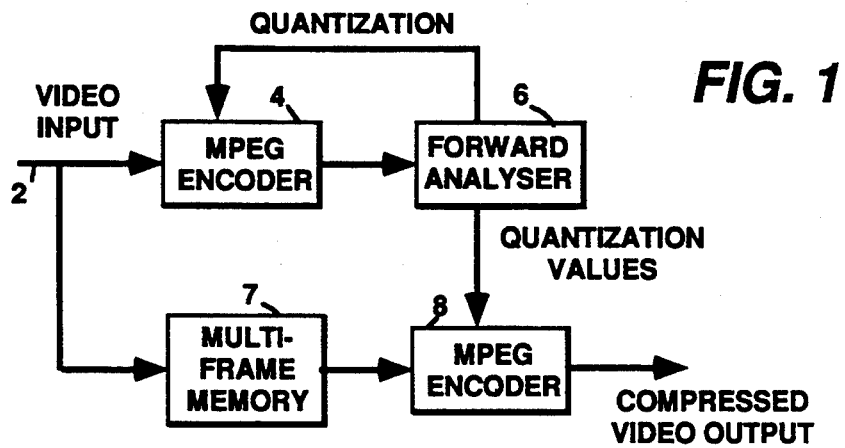
FIGS. 1 and 2 are block diagrams of alternative video signal compression systems including quantization apparatus embodying the present invention.

The present invention will be described in the environment of a video signal compressor of the type which does block or macroblock type of signal compression/handling, such as, for example, an MPEG-like compression system. MPEG is a system standard developed by the Moving Picture Experts Committee of the International Organization for Standardization. An example of an MPEG-like system may be found in U.S. Pat. No. 5,122,875. The MPEG-like systems perform motion compensated predictive compression on respective successive groups of frames, GOP's. Within a compressed GOP the frames are designated I, P or B depending upon whether they are compressed by intraframe processing, forward interframe processing and bidirectional interframe processing respectively. Because the different frame types are compressed differently, the volume of compressed data for the different frame types may be different, even for the same image, hence different quantization values are appropriate for the different compressed frame types.

Compressed image data in an MPEG-like system is arranged in macroblocks which represent a matrix of e.g., $16\times 16$ contiguous pixels. Respective macroblocks are configured of four $8\times 8$ blocks of luminance data and two $8\times 8$ blocks of chrominance data. Each $8\times 8$ block of chrominance data represents the entire $16\times 16$ matrix of pixels. The macroblocks are arranged in slices, with each slice representing, for example, 16 horizontal lines of video signal. One frame of 496 active lines can therefor be represented by 31 slices. MPEG-like systems typically quantize data on a macroblock basis.

Quantization in the present invention is nominally performed using fixed quantization values as long as the total coded data does not exceed a predetermined amount. If it does then only the macroblocks of data that exceed certain limits are adaptively quantized, with all other macroblocks undergoing fixed quantization. In an MPEG-like compression environment, a maximum codeword target value is established for a GOP. This maximum target $R_{GOP}$ is distributed amongst the respective frames in the GOP according to the compression process utilized for the respective frames. The $R_{GOP}$ is reflected in global quantization factors $Q_I$, $Q_P$, $Q_B$ used to modify the quantization values in the respective quantization matrices.

The total number of bits, R, used to code a GOP at a selected image quality is estimated from the relation;

$$R = r_I + \left(\frac{N}{M} - 1\right)r_P + \left(N - \frac{N}{M}\right)r_B \quad (1)$$

where $r_I$, $r_P$, $R_B$ are the average nominal bit rates for VBR encoding intraframe, forward and bidirectional interframe predicted frames respectively, N is the number of frames in a GOP, and M is the number of B frames between two P frames. At system start up nominal values may be used for $r_I$, $r_P$, $r_B$ in the first GOP, and thereafter the values from the prior GOP may be utilized until the first I, P and B frames are encoded for the current GOP. If the estimate R is less than $R_{GOP}$, the COP is quantized with fixed quantization selected to produce a predetermined image quality. If it is not, a target bit allocation $R_j$ is computed for each frame type as;

$$R_j = \frac{R_{GOP}}{W_j} \quad j = \{I, P, B\} \quad (2)$$

where $$W_j = \begin{cases} 1 + \left(\frac{N}{M}\right) - 1\right)\frac{1}{k_1} + \left(N - \frac{N}{M}\right)\frac{1}{k_2} & \text{for } j = I \\ k_1 + \left(\frac{N}{M} - 1\right) + \left(N - \frac{N}{M}\right)\frac{k_1}{k_2} & \text{for } j = P \\ k_2 + \left(\frac{N}{M} - 1\right)\frac{k_2}{k_1} + \left(N - \frac{N}{M}\right) & \text{for } j = B \end{cases} \quad (3)$$

and $$k_1 = \frac{r_I}{r_P}, \quad k_2 = \frac{r_I}{r_B} \quad (4)$$

Each frame is first compressed using fixed quantization, and the total number of coded bits, $r_j$, for the frame is counted. After this first compression pass an excess rate fraction, xs-frac, is computed according to the equation;

$$\text{xs-frac} = \frac{r_j - R_j}{r_j} \quad j = I, P \text{ or } B \quad (5)$$

In addition a threshold value. ThV, is calculated from;

$$ThV = E[mb_{size}] + StD[mb_{size}]$$

where $E[mb_{size}]$ is the average number of compressed bits per macroblock in the frame and $StD[mb_{size}]$ is the standard deviation in the number of bits per macroblock. The value ThV may be computed using the volume of data in respective macroblocks either prior to or after quantization. That is ThV may be a function of unquantized data or quantized data. A more generalized form of the equation for ThV may be given by;

$$ThV = K_1(E[mb_{size}]) + K_2(StD[mb_{size}]) + K_3$$

where K1, K2 and K3 are constants to be determined by experiment.

If the value of xs-frac is less than zero, the number of coded bits is within the set limits, and the frame is coded in normal VBR mode with the fixed quantization used in the first compression pass. If it is not, a second compression pass is invoked. In the second pass, fixed quantization is used for all macroblocks whose size is less than ThV. For the remaining macroblocks a larger quantization factor is selected. This larger quantization factor may be selected according to a formula and/or dependent upon, for example, the difference between $mb_{size}(i)$ and ThV. In this instance the possible difference values may be divided into ranges, and a quantization factor increment assigned to each range. Assume that the potential difference values are divided into three ranges which encompass 50, 30 and 20 percent of the possible values, with the 50, 30 and 20 percent ranges including the lowest to the highest values respectively. The 50, 30 and 20 percent ranges may be assigned increment values of 1, 2 and 3 respectively. Thus if a $mb_{size}(i)$ exceeds ThV by an amount represented by the second range, the current quantization factor for that block is incremented by 2.

Alternatively the use of empirical lookup tables of quantization factors for macroblocks exceeding the threshold has been found to produce good results. FIGS. 4, 5, and 6 represent such empirical lookup tables. In selecting a larger quantization factor two quantities are used to enter the empirical table. These two quantities are the current quantization factor and the variable xs-frac. The output from the table is an updated quantization factor which is used to quantize the current macroblock. Different tables are used for the different encoded frame types. The tables in FIGS. 4, 5 and 6 correspond to values developed for use with I, P and B frames respectively. It should be noted that certain macroblocks in P and B encoded frames may be intraframe encoded. In this instance the I table will be used for such I-type macroblocks found in P or B frames. In these tables the values labelled OLD qi are the current quantization factors (used to address the table), the values labelled NEW qi are the new quantization factors output from the table, and the values shown internal to the table are the values xs-frac multiplied by a predetermined amount, e.g. one hundred, which xs-frac values are also used to address the respective tables.

It has been found to be beneficial to update the threshold value ThV on a macroblock by macroblock basis. To this end a running variable $\alpha$ is computed as respective macroblocks are processed. Successive threshold values $ThV_n$ are calculated according to:

$$ThV_n = \alpha_n(ThV) \quad (6)$$

The variable $\alpha_n$ is calculated from the equation:

$$\alpha_{n+1} = \alpha_n - \gamma_n K_n \quad (7)$$

Successive values of $\alpha$ are reduced by the quantity $\gamma_n K_n$. The factor $\gamma_n$ is utilized to insure that the quantity $\gamma_n K_n$ does not grow too rapidly, that is to insure that $\alpha$ is not reduced too rapidly. Both factors are a function of the accumulated number of bits occurring in the preceding macroblocks. The factor $K_n$ is given by:

$$K_n = s\left(\frac{\text{xs-frac} - \text{Cut-frac}_n}{\text{xs-frac}}\right) \quad (8)$$

where s is a constant such as 0.1 and the variable Cut-frac is computed from;

$$\text{Cut-frac}_n = \frac{\sum_{i=1}^{n} \text{bits-cut}(i)}{\sum_{i=1}^{n} mb_{size}(i)} \quad (9)$$

The term bits-cut refers to the number of coded bits by which the preceding macroblocks have been reduced as a result of adaptive quantization of the macroblocks exceeding ThV.

The variable $\gamma_n$ is computed using the equation;

$$\gamma_n = \frac{\sum_{i=1}^{n} mb_{size}(i)}{\sum_{i=1}^{N} mb_{size}(i)} \quad (10)$$

and bears a very small value until a significant number of the busier macroblocks in a frame have been processed. Alternatively $\gamma_n$ may be assigned fixed values for different groupings of macroblocks. This value may be zero, 0.1 and 0.25 for the first occurring one third of the macroblocks, the second occurring one third of the macroblocks and the third occurring one third of the macroblocks respectively. Note that the values calculated in equations (6) through (10), after processing the $n^{th}$ macroblock, are applied in processing the $n+1^{th}$ macroblock.

The foregoing process may be iterated several times before the total coded bits satisfy equation (5). For successive iterations the variable xs-frac is weighted in a direction to provide larger quantization factors from the empirical tables. A working table of quantization factors is kept, in which the quantization factor for each macroblock is stored. As quantization factors for respective macroblocks are changed the corresponding quantization factor in the table is updated. After the necessary iterations are completed the respective frame is recoded using the quantization factors stored in the table for quantizing the respective macroblocks.

FIG. 1 illustrates a general form of a system for practicing the invention. This particular system assumes MPEG encoding, but it will be recognized that any encoder which operates on a block basis may incorporate the invention. Video signal to be encoded is applied to a bus 2, which is coupled to the input of an MPEG encoder 4 and a memory device 7. The encoder 4 is coupled to a forward analyzer 6, and communicates thereto information related to the encoding process. This information primarily comprises the current frame type, the current macroblock type, the current quantization factor for respective macroblocks and the number of bits encoded. From this data the forward analyzer performs the computations of equations (1)–(10) and generates new quantization factors which are loaded in the aforementioned working table. The forward analyzer 6 forces sufficient coding iterations of each frame to adapt the quantization factors such that equation (5) is satisfied.

The video data stored in the memory 7 is coupled to a second MPEG encoder 8, a frame at a time, after quantization factors for the corresponding frame have been determined by the forward analyzer. Concurrently with the stored frame being coupled to the second MPEG encoder the forward analyzer couples the quantization factors from the working table of quantization factors selected for that corresponding frame. The MPEG encoder 8 uses these quantization factors for encoding the corresponding frame of video data.

A system like that illustrated in FIG. 1 can process more data per unit time but tends to be hardware intensive. A less hardware intensive system is illustrated in FIG. 2, wherein certain parts of the apparatus are operated in time division multiplexed fashion to perform the respective operations of forward analysis and encoding.

Figure 2:
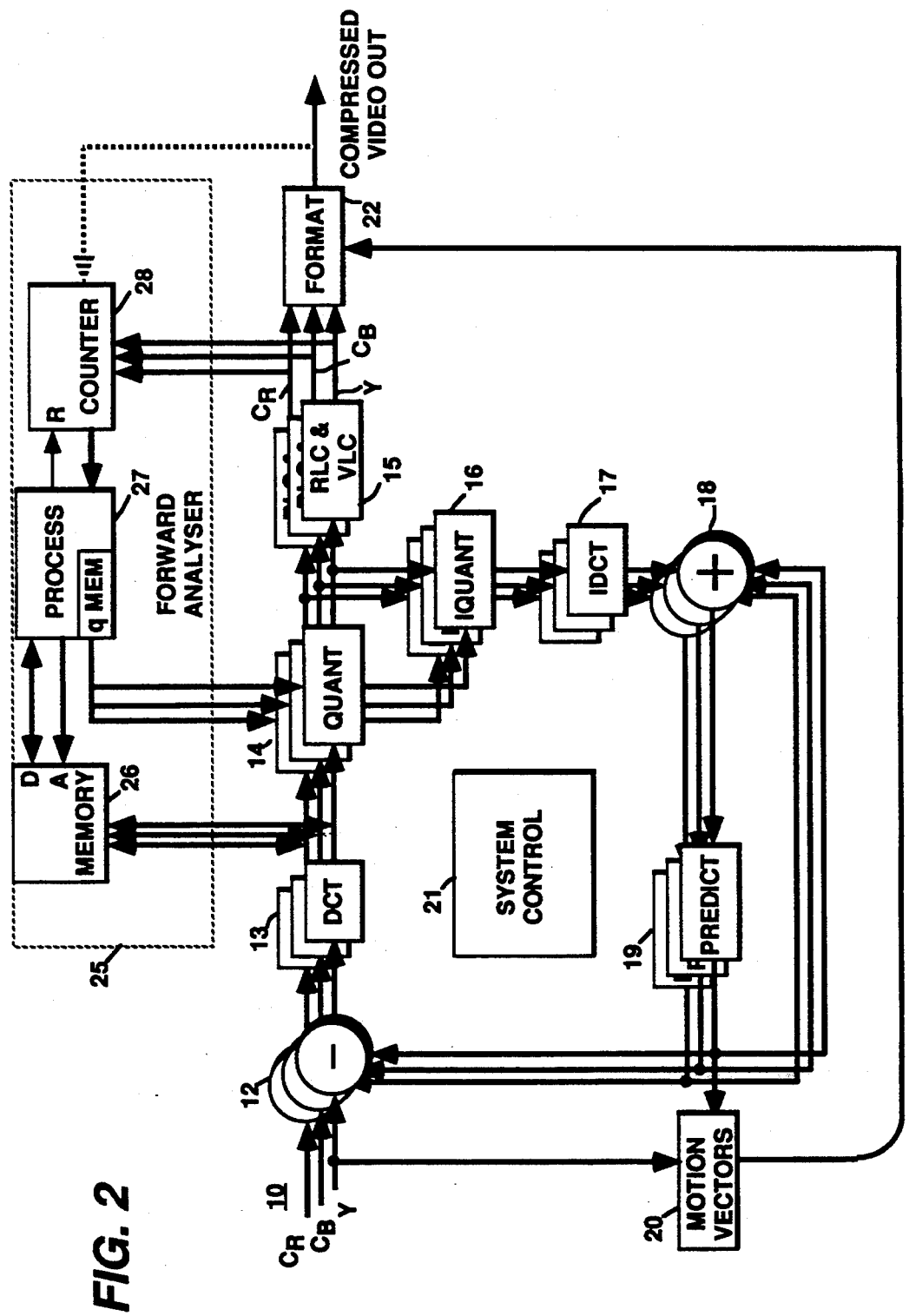

In FIG. 2 the elements 10 to 22 comprise a typical motion compensated predictive encoder. There are three parallel processing paths shown, respective ones of which process the luminance and two chrominance video components. The motion compensation apparatus 20 operates on the luminance signal to generate motion vectors, which vectors are used in the three processing paths. A common controller 21 communicates with the respective processing circuitry and directs the general operation of the encoder. The operation of motion compensated predictive encoders is well known and will not be described in detail herein.

The apparatus of FIG. 2 also includes a forward analyzer 25 including a storage element 26, a processor 27, and a counter 28. The processor 27 controls the storage element 26, the counter 28, and communicates with the controller 21 to interrupt processing to allow iteration of quantization adaption. In FIG. 2, a frame of video signal is applied to the bus 10 and compressed (encoded) using fixed quantization. As the respective blocks of partially compressed data are generated by the DCT processor, 13, these blocks are stored in the memory 26 to be used for subsequent iterations of quantization factor generation. The quantized data from the quantizing element 14, is applied to a run-length and variable length encoder 15. Run and variable length encoded data from the encoder 15 and motion vectors from element 20 are coupled to a formatter 22. The formatter 22 generates header data and arranges the blocks of data from the encoder 15, the motion vectors, and the header data into macroblocks, slices, frames and GOP's etc.

Coded data from either the encoder 15 or the formatter 22 is counted by the counter 28 to determine the data $r_j$ for the encoded frame. Whether the data from the formatter 22 or the encoder 15 is counted depends upon whether the amount of data corresponding to motion vectors and/or header data is relatively constant and predictable for the respective frame types. If it is, then data may be counted at the output of either device, and if it is not then the data to be counted must be derived from the output of the formatter 22.

Figure 3:
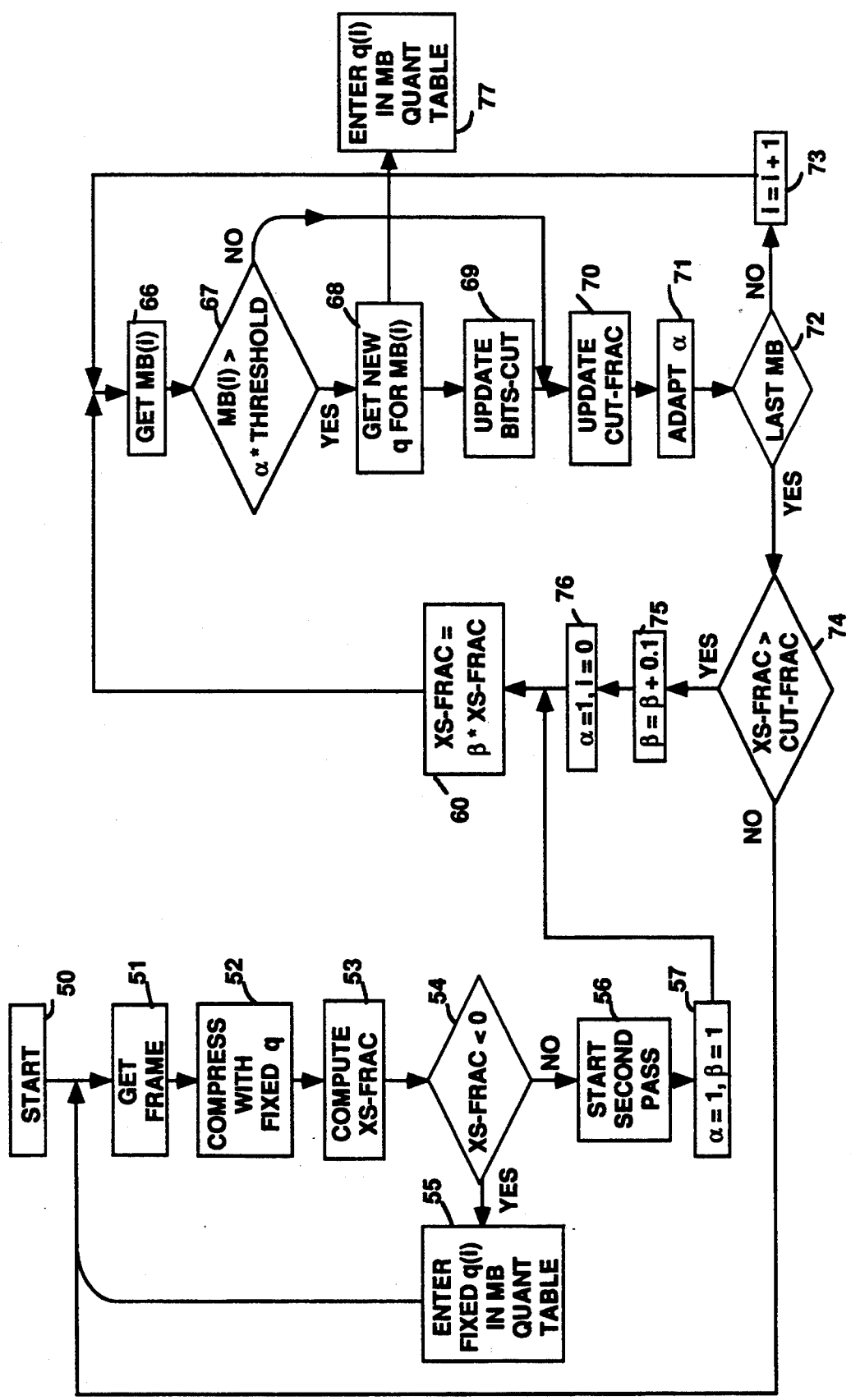
FIG. 3 is a flow chart of the operation of the FORWARD ANALYSER shown in FIG. 2.

The processor 27 is programmed to communicate with the system controller 21 to acquire the bit rate $R_{GOP}$, and at the end of each encoding pass to acquire the count of encoded bits from the counter 28. Using this data the processor 27 performs the quantization factor adaption. This process will be described with the aid of the flowchart of FIG. 3. The system is initialized 50 by applying user parameters to the system controller 21, which parameters indicate for example the type of video source material, the desired coding resolution, the desired image quality etc. The system controller is substantially a state machine and these parameters establish the starting and selected states. If such user parameters are not entered, the system controller loads a set of default parameters, one of which is $R_{GOP}$. The $R_{GOP}$ value is communicated to the processor 27, and nominal values for $r_I$, $r_P$, $r_B$ are accessed from, for example, read only memory. Using these values the processor 27 calculates the respective $R_j$ values.

Next the system controller accesses [51] the first frame of data. The respective frames are designated I, P, B by the controller 21 according to the relative position in the sequence of input frames that particular frames occur. The frame is encoded [52] using a quantization table and a global quantization factor $Q_j$ selected to provide a predetermined image quality. During this process the blocks of data provided from the DCT apparatus are stored in the memory 26. As respective macroblocks are encoded, a count value from the counter 28 associated with the macroblock is also stored. This count value may be the cumulative count from the beginning of the frame, or a value indicating the amount of coded data for the respective macroblock. The latter value may be obtained by storing the output from the counter for one macroblock period and subtracting the respective stored count value from the cumulative count value associated with the next successive macroblock.

After the frame is compressed, the total data, $r_j$, for the encoded frame is acquired from the counter 28 and the variable xs-frac is calculated [53] according to equation (5). In addition the threshold value ThV is also calculated. The variable xs-frac is tested [54] to determine if it is positive. If it is positive, the encoded data for the frame are less than the $R_j$, and no quantization adjustments are required. The global quantization factor is loaded [55] into all of the locations of a working quantization table (q MEM) within the processor 27.

At this point there are at least two system alternatives. The system can be instructed to re-encode the frame using the global quantization factor, and to output the encoded data to further circuitry such as a rate buffer (not shown). In this instance such further circuitry would be inhibited from accepting data from the formatter until after the decision made in step [54]. In an alternative system, the formatter may be coupled to a memory which stores the lastmost frame of encoded data. Then if the condition of step [54] is true the encoded data in such memory is output, obviating re-encoding the frame.

If xs-frac is not less than zero [54], the quantization adaption process is initiated [56]. Variables $\alpha$ and $\beta$ are set [57] to 1, and the variable xs-frac is scaled [60] by $\beta$. In the first iterative pass, since $\beta$ is equal to 1, xs-frac is unchanged. However in successive iterations $\beta$ is incremented hence xs-frac is increased providing two results. The first is that quantization values selected from the respective tables will be greater. The second is that the variable $\alpha$ will change more rapidly.

After xs-frac is scaled, the first macroblock in the frame is accessed [66] from the memory 26, and the macroblock is tested [67] to determine if the amount of coded data for that macroblock exceeds the current threshold value. The current threshold value is the original threshold value ThV scaled by the variable $\alpha_n$. If the amount of coded data for the current macroblock exceeds the current threshold value, the appropriate empirical table is addressed [68] using the current quantization factor and the value xs-frac to secure a new quantization factor for that specific macroblock. That quantization factor is loaded [77] in the working quantization table (q MEM in the processor 27), at an address location associated with the respective macroblock. The variable bits-cut is updated [69] and the variable Cut-frac is updated [70] from data stored in the memory 26 and data provided from the counter 28. The variables $\gamma_n G_n$ and $\alpha_n$ are updated according to equations (7, 8 and 10) at step [71]. A check is made [72] to determine if the last macroblock has been processed. If not, the macroblock address is incremented [73] and the next macroblock of data is accessed from the memory 26.

If the last macroblock has been processed [72] the variable xs-frac is tested [74] against the variable Cut-frac to determine if sufficient data reduction has been attained. If it has, then the system is instructed to re-encode the frame with the quantization factors in the working quantization table, and then to get the next frame [51].

If one or more iterations are required to establish the requisite quantization factors, it is necessary to re-encode the corresponding frame of data because varying the quantization factors will affect the predicted frames provided by the predictor 19. During re-encoding of the frame, however it is not necessary to recalculate the motion vectors, since they should not be affected. This presumes that the formatter 22 includes sufficient memory to store the motion vectors so that they need not be recomputed.

Returning to step [67], if the test is not true, no action need be taken regarding the tested macroblocks, and the process jumps to step [70] to update Cut-frac in preparation for examining the next macroblock. At step [74] if the test is true a further iteration is initiated. $\beta$ is incremented [75] (by a small amount, for example 0.1), and the macroblock address is reset [76] to the first macroblock of a frame and $\alpha$ is reset to 1.

During each quantization iteration it is not necessary to re-encode the frame of data. The only data necessary for these calculations is the macroblock data from the first encoding pass, which data is stored in the memory 26. It is possible however to dispense with an extra memory 26 and re-encode all of the data each iteration if time and power constraints permit.

Figure 7:
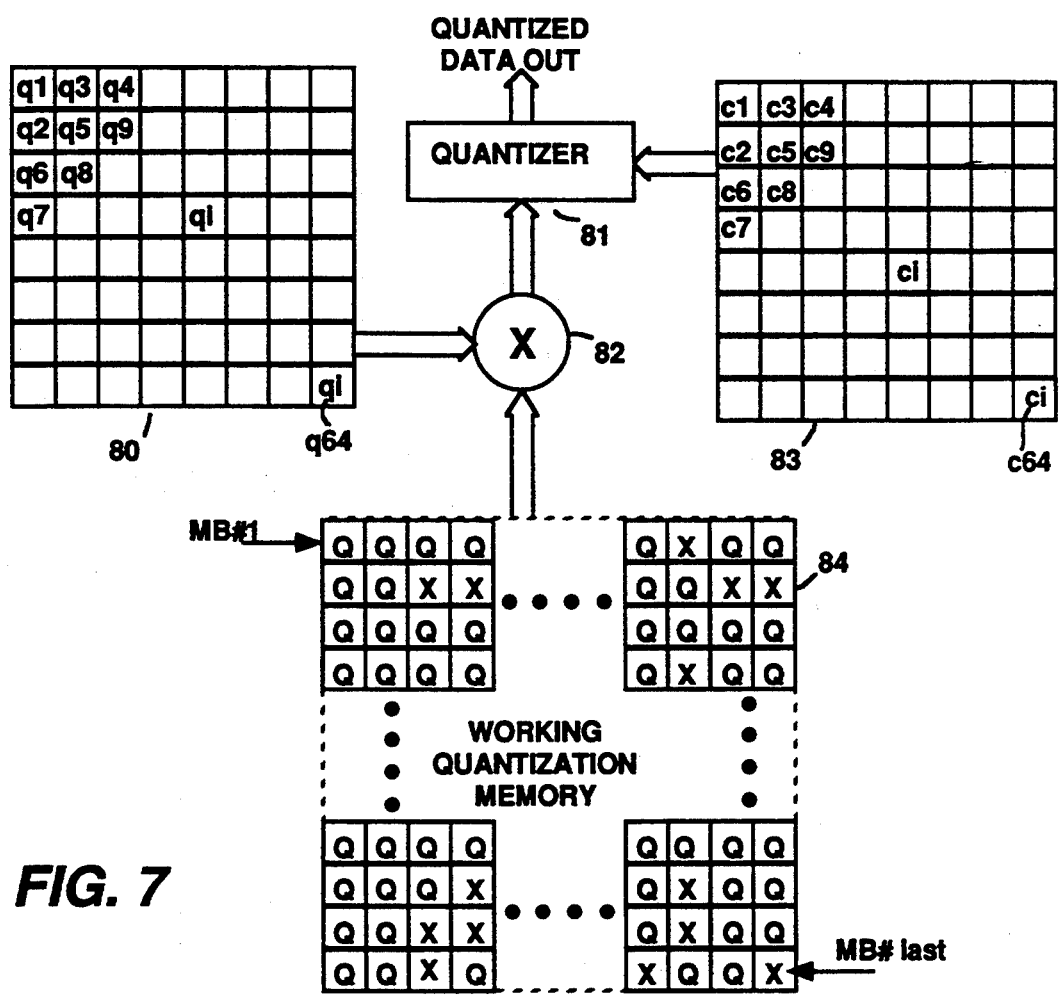
FIG. 7 is a pictorial representation of a quantizing system.

The actual quantization process is elucidated with respect to FIG. 7. In FIG. 7 the block 83 represents a block of coefficient data from a given macroblock. The respective coefficients $C_i$ (corresponding to discrete cosine transform coefficients for example) are arranged in a predetermined order such as according to the ascending index i. The block designated 80 represents a matrix of quantization values $q_i$. These quantization values are selected so as to provide greater and lesser quantization to coefficients in the block 83 which are of lesser and greater importance, respectively, to image reproduction. Thus when coefficients c1, c2, ... c8 etc. are applied to the quantizer 81, quantization values q1, q2, ... q8 etc. are concurrently accessed and applied to perform the quantization. However the values qi are indirectly applied to the quantizer 81 via a variable scaling circuit 82. The respective quantization values are scaled by weighting factors stored in the working quantization memory 84.

The respective blocks in the memory 84 correspond to the quantization factor to be applied to a particular macroblock in a frame. For fixed quantization the memory 84 is loaded with one value which is equal to a global quantization factor related to the particular frame type i.e. $Q_I$, $Q_P$ or $Q_B$. The Q's in the blocks of the memory 84 represent the global quantization factor. The X's represent updated quantization factors resulting from the foregoing quantization adaption process. These updated values are inserted into memory 84 at step [77] in FIG. 3.

As blocks of coefficients 83 are applied to the quantizer 81, the corresponding quantization factor from the memory 84 is applied to the scaling circuit 82 to produce quantization values $Q_j(q_i)$ or $X(q_i)$, which are coupled to the quantizer 81. The quantizer 81 may be of the form which quantizes the respective coefficients according to the functions:

$$QCi = (16 * c_i + 8)//(2 * X_{qi}); \quad ci > 0$$
$$QCi = (16 * c_i - 8)//(2 * X_{qi}); \quad ci < 0$$
$$QCi = 0; \quad ci = 0$$

where QCi is the quantized coefficient, $X_{qi}$ represent the quantization values provided from the scaling circuit 82, the asterisk * denotes multiplication and // specifies inter division.

In the discussion above the variable xs-frac was changed or updated on a frame basis. This variable may be updated on a shorter basis such as every slice or every W macroblocks.

Figure 8:
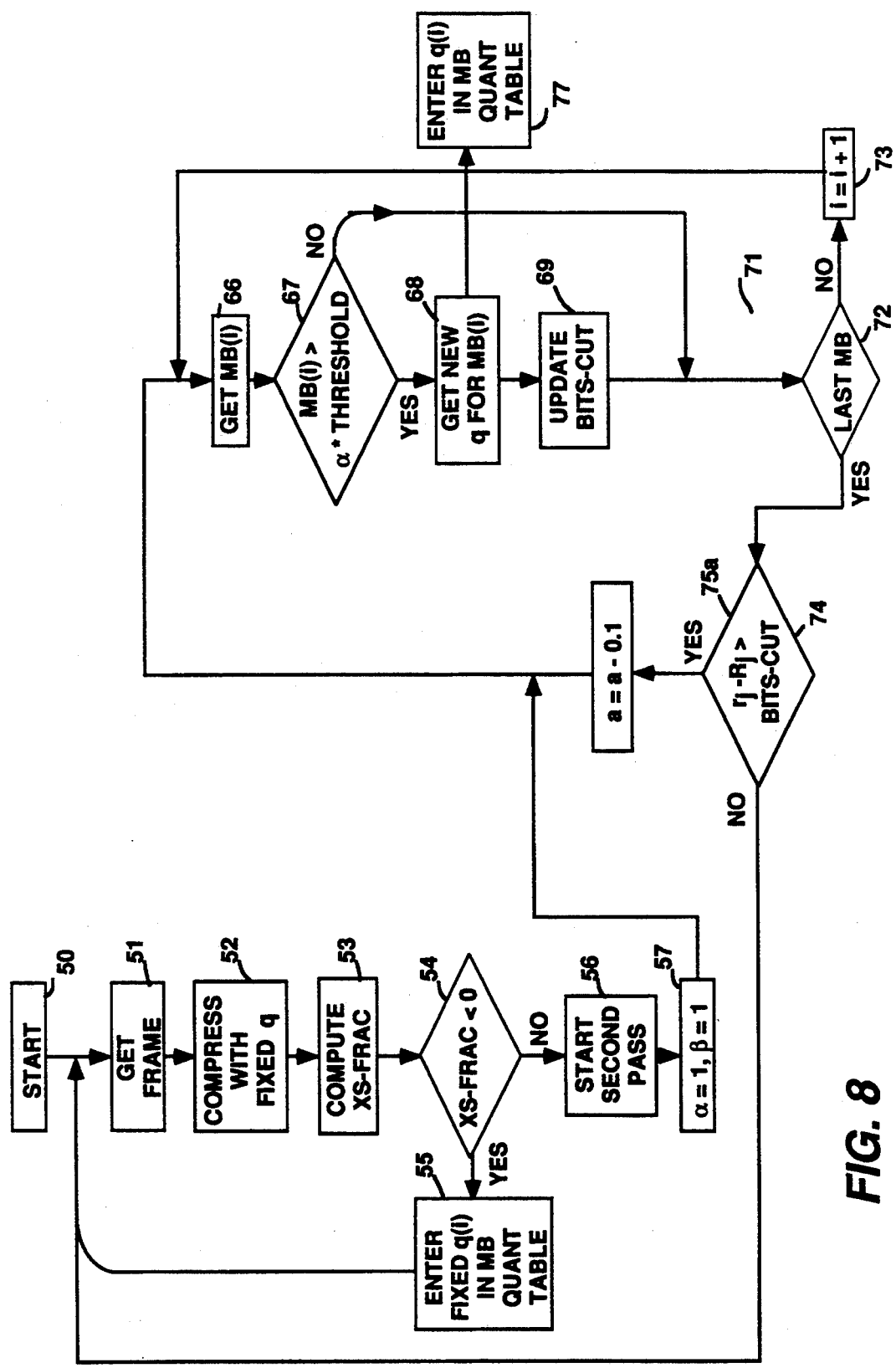
FIG. 8 is a flow diagram of an adaptive quantization system wherein the threshold value is changed on a frame/field basis.

FIG. 8 illustrates a flowchart for a simplified adaptive quantizing system. In this system the threshold value $ThV_n$ is changed on a frame basis rather than a macroblock basis. Changing the threshold on a frame basis requires a more accurate estimate of the initial threshold value, but provides more uniform image quality. Note the system of FIG. 8 does not require the calculation of the variables defined in equations (8) and (10). In this instance α is decremented by a constant each iteration. In FIG. 8 the value of BITS-CUT is given by $$BITS-CUT = \sum_{i=1}^{n} bits\text{-}cut(i)$$

where bits-cut(i) is equal to the number of bits a particular macroblock is reduced from the initial encoding pass.

A major feature of this invention is that adaptive quantization is performed on only certain blocks (macroblocks) in each frame. These blocks tend to be blocks which contain a greater amount of image detail then average blocks within a respective frame. Adaptively quantizing these "busier" blocks has the least deleterious affect on image quality, hence subjective image quality is not substantially affected by the process.

At present the invention has not been optimized since sufficient statistics for compressed video data were not available to the inventors. However, it is very probable, when such statistics are available, that a threshold value function which is related to the amount of data in respective macroblocks will be determined, which will allow quantization factor determination from the data generated during the first compression pass with fixed quantization.

What is claimed is:

1. Apparatus for quantizing video signal occurring in frames with respective frames being divided into a plurality of blocks of codewords, said apparatus comprising:
   a source of said blocks of codewords;
   means for determining the volume of coded data for respective said blocks of codewords, said coded data corresponding to said blocks of codewords being quantized with a predetermined quantizing factor;
   means for providing a threshold value which is a function of an average or mean volume of coded data for a plurality of said blocks;
   comparing means for determining whether the volume of coded data in respective blocks of codewords is greater or lesser than said threshold value; and
   means for quantizing the blocks of codewords corresponding to blocks of codewords whose volume of coded data is less than said threshold value according to a further predetermined quantizing factor selected to provide reproduced images with predetermined image quality, and for adaptively quantizing blocks of codewords corresponding to blocks of codewords whose volume of coded data exceeds said threshold value, with still further quantizing factors to provide greater quantization than said further predetermined quantizing factors, and wherein said further predetermined quantizing factor may be equal to said predetermined quantizing factor.

2. The apparatus set forth in claim 1 wherein said means for quantizing comprises:
   a source of a matrix of quantizing values preselected for quantization of particular codewords in respective blocks;
   means for weighting said matrix of quantizing values; and
   means for applying a predetermined quantizing factor to said means for weighting for respective blocks of codewords whose volume of data is less than said threshold value, and for applying adaptively generated quantizing factors for respective blocks of codewords whose volume exceeds said threshold value.

3. The apparatus set forth in claim 1 wherein said means for quantizing further includes:
   a forward analyzer for coding a predetermined number of blocks of codewords with a constant quantizing matrix;
   means for determining a variable (xs-frac) which is a function of the difference between a target and actual total amount of quantized data for said predetermined number of blocks of codewords;
   a first memory having tables of preselected quantizing factors stored at respective address locations corresponding to respective blocks of codewords; and
   means for addressing said first memory with addresses corresponding to said respective blocks of codewords and said variable (xs-frac) to obtain a quantizing factor for adjusting quantizing values for said respective blocks of codewords.

4. Apparatus for quantizing video signal occurring in frames with respective frames being divided into a plurality of blocks of codewords said apparatus comprising:
   a source of said blocks of codewords:
   means for determining the volume of coded data for respective said blocks of codewords when quantized with a predetermined quantizing factor;

means for statistically analyzing the volume of coded data from a predetermined plurality of said blocks of codewords;

means responsive to statistics provided by such statistical analysis for generating a threshold value;

comparing means for determining whether the volume of coded data in respective blocks of codewords is greater or lesser than said threshold value; and means for quantizing the blocks of codewords corresponding to blocks of codewords whose volume of coded data is less than said threshold value according to a further predetermined quantizing factor selected to provide reproduced images with predetermined image quality, and for adaptively quantizing blocks of codewords corresponding to blocks of codewords whose volume of coded data exceeds said threshold value, with still further quantizing factors to provide greater quantization than said further predetermined quantizing factors, and wherein said further predetermined quantizing factor may be equal to said predetermined quantizing factor.

5. The apparatus set forth in claim 4 wherein respective blocks of codewords have respective volumes of coded data and said means for statistically analyzing provides a value representing the average volume of coded data per block of codewords over said plurality of blocks of codewords, and a standard deviation of the volume of coded data from said average volume of coded data per block of codewords and said means responsive to statistics generates said threshold value as a function of said average volume of coded data and said standard deviation.

6. The apparatus set forth in claim 4 wherein said blocks of codewords are arranged in macroblocks and said apparatus further includes means for altering said threshold value on a macroblock by macroblock basis.

7. The apparatus set forth in claim 4 wherein said blocks of codewords are arranged in macroblocks and said apparatus further includes means for periodically altering said threshold value for respective subsequent macroblocks as a function of a reduction in coded data of previously quantized macroblocks, due to adaptive quantization of said previously quantized macroblocks compared to said previously quantized macroblocks having been quantized with said predetermined quantizing factor.

8. A method for quantizing partially compressed video signal occurring in blocks of codewords, a plurality of such blocks of codewords representing a frame of video signal, said method comprising:

generating coded data for respective said blocks of codewords corresponding to Said blocks of codewords being quantized with a predetermined quantizing factor;

determining a threshold value as a function of the average or mean volume of coded data in respective said blocks of codewords over a plurality of said blocks of codewords; comparing the volume of coded data for respective blocks of codewords against said threshold value;

quantizing blocks of codewords having a volume of coded data less than said threshold value with a further predetermined quantizing factor selected to provide variable bit rate coded data which will provide reproduced images with a predetermined image quality; and adaptively quantizing blocks of codewords having a volume of coded data greater than said threshold value with quantizing factors which produce coarser quantization than said further predetermined quantizing factor, and wherein said further predetermined quantizing factor may equal said predetermined quantizing factor.

9. The method set forth in claim 8 wherein said blocks of codewords are arranged in macroblocks, and said macroblocks are arranged in slices, said method further including adjusting said threshold value after quantizing ones of said slices.

10. The method set forth in claim 8 further including iteratively quantizing frames of video signal and adjusting said threshold value after quantizing respective frames.

11. The method set forth in claim 8 wherein said quantizing factors, for quantizing blocks of codewords having a volume of coded data greater than said threshold value, are selected from a table of empirically generated quantizing factors.

12. The method of claim 8 further including the steps of:

establishing a table of quantizing factors for respective blocks of codewords;

selecting quantizing factors for blocks of codewords having a volume of quantized coded data greater than said threshold value, as a function of quantizing factors from said table which correspond to respective blocks of codewords; and substituting selected quantizing factors for the quantizing factor in said table which correspond to respective blocks of codewords, 13. The method set forth in claim 12 further including;

determining differences between the volume of quantized coded data for blocks of codewords quantized with said fixed quantizing factor and said selected factors; and altering said threshold value as a function of said differences.

14. A method for quantizing partially compressed video signal occurring in blocks of codewords, a plurality of such blocks of codewords representing a frame of video signal, said method comprising:

generating coded data for respective said blocks of codewords corresponding to said blocks of codewords being quantized with a predetermined quantizing factor;

determining one of the mean or average volume E{b} of coded data for the blocks of codewords in said plurality of blocks of codewords;

determining the standard deviation of the volume STD{b} of coded data for said plurality of blocks of codewords;

determining a threshold value ThV according to a function of the form, $$ThV = K_1(E\{b\}) + K_2(STD\{b\}) + K_3$$

where $K_1$, $K_2$, and $K_3$ are constants;

comparing the volume of coded data for respective blocks of codewords against said threshold value:

quantizing blocks of codewords having a volume of coded data less than said threshold value with a further predetermined quantizing factor selected to provide variable bit rate coded data which will provide reproduced images with a predetermined image quality: and adaptively quantizing blocks of codewords having a volume of coded data greater than said threshold value, with quantizing factors which produce coarser quantization than said further predetermined quantizing factor, and wherein said further predetermined quantizing factor may equal said predetermined quantizing factor.

15. The method set forth in claim 14 further including:

determining a total volume of coded data for a frame of video signal quantized with said predetermined quantizing factor;

determining a difference between said total volume of coded data and a target value; and selecting quantizing factors for blocks of codewords having a volume of quantized coded data greater than said threshold value as a function of said predetermined quantizing factor and said difference.

16. The method set forth in claim 15 wherein said quantizing factors, for quantizing blocks of codewords having a volume of data greater than said threshold value, are selected by addressing a table, having empirically generated quantizing factors at respective address locations, with address values representing said fixed quantizing value and said difference.

17. A method for quantizing partially compressed video signal occurring in blocks of codewords, a plurality of such blocks of codewords representing a frame of video signal, said method comprising:

generating coded data for respective said blocks of codewords corresponding to said blocks of codewords being quantized with a predetermined quantizing factor;

determining a threshold value, ThV, related statistically to the volumes of coded data in respective said blocks of codewords over a plurality of said blocks of codewords;

comparing the volume of coded data for respective blocks of codewords against said threshold value;

quantizing blocks of codewords having a volume of coded data less than said threshold value with a further predetermined quantizing factor selected to provide variable bit rate coded data;

adaptively quantizing blocks of codewords having a volume of coded data greater than said threshold value with quantizing factors which produce coarser quantization than said further predetermined quantizing factor, wherein said further predetermined quantizing factor may equal said predetermined quantizing factor; and successively adjusting said threshold value after quantizing ones of said blocks of codewords according to an algorithm $$ThV_n = \alpha_n ThV$$

where $\alpha_n$ is a variable updated for successive blocks n according to the relation $$\alpha_n = \alpha_{n-1} - \gamma_n K_{n-1}$$

$K_{n-1}$ is related to a reduction in the total quantized data due to adaptive quantization of a predetermined number of previously quantized macroblocks and $\gamma_n$ is a variable dependent upon an accumulated amount of coded data.

* * * * *